(12) United States Patent
Muratani

(10) Patent No.: US 7,613,320 B2
(45) Date of Patent: Nov. 3, 2009

(54) DIGITAL WATERMARK EMBEDDING APPARATUS AND METHOD, AND DIGITAL WATERMARK ANALYSIS APPARATUS, METHOD AND PROGRAM

(75) Inventor: Hirofumi Muratani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/246,234

(22) Filed: Oct. 6, 2008

(65) Prior Publication Data

US 2009/0049304 A1 Feb. 19, 2009

Related U.S. Application Data

(63) Continuation of application No. 10/648,522, filed on Aug. 27, 2003, now Pat. No. 7,443,999.

(30) Foreign Application Priority Data

Aug. 28, 2002 (JP) .............................. 2002-248491

(51) Int. Cl.
*G06K 9/00* (2006.01)
(52) U.S. Cl. ..................................... 382/100
(58) Field of Classification Search ................. 713/176; 380/54, 29, 21, 42, 44, 45; 707/1–3; 382/100
See application file for complete search history.

(56) References Cited

U.S. PATENT DOCUMENTS 6,807,634 B1 * 10/2004 Braudaway et al. ......... 713/176
6,901,515 B1    5/2005 Muratani
7,068,823 B2    6/2006 Malik et al.
7,346,777 B2    3/2008 Muratani
2002/0181732 A1  12/2002 Safavi-Naini et al.
2005/0086486 A1   4/2005 Yacobi et al.
2005/0086487 A1 * 4/2005 Yacobi et al. ............... 713/176
2005/0108535 A1   5/2005 Bruekers et al.

FOREIGN PATENT DOCUMENTS

JP    2001-285623    10/2001
JP    2002-165081     6/2002

OTHER PUBLICATIONS

Dan Boneh, et al., "Collusion-Secure Fingerprinting for Digital Data", Advance in Cryptology: Proceedings of CRYPTO'95, Springer-Verlag, 1995, pp. 452-465.

(Continued)

*Primary Examiner*—Brian P Werner
*Assistant Examiner*—Claire Wang
(74) *Attorney, Agent, or Firm*—Oblon, Spivak, McClelland, Maier & Neustadt, L.L.P.

(57) ABSTRACT

A digital watermark embedding apparatus comprises below units. A first generation unit generates a plurality of symbol sequences each of which includes a plurality of symbols including ranks, each of the ranks being uniquely numbered among each of the symbol sequences, each of the symbol sequences uniquely corresponding to each of a plurality of identification information items to be embedded as digital watermark information into each of copies of digital contents. A second generation generates a plurality of to-be-embedded codes corresponding to each of the symbols in each of the symbol sequences. An embedding unit embeds the to-be-embedded codes in each of the copies.

12 Claims, 6 Drawing Sheets

OTHER PUBLICATIONS

R. Safavi-Naini, et al., "Collusion Secure q-ary Fingerprinting for Perceptual Content", Workshop on Security and Privacy in Digital Rights Management 2001, Nov. 21, 2001, pp. 1-18.

Hirofumi Muratani, "A Collusion-Secure Fingerprinting Code Reduced by Chinese Remaindering and Its Random-Error Resilience", Information Hiding Proceedings of the $4^{th}$ International Workshop, IH 2001, pp. 303-315, 2001.

Joe Kilian, et al., "Resistance of Digital Watermarks to Collusive Attacks", NEC Research Institute, Technical Report TR-585-98, 1998, pp. 1-23.

Yacov Yacobi, "Improved Boneh-Shaw Content Fingerprinting", Topics in Cryptology—C-RSA 2001, pp. 378-391, 2001.

Dan Boneh, et al., "Collusion-Secure Fingerprinting for Digital Data", IEEE Transactions on Information Theory, vol. 44, No. 5, Sep. 1998, pp. 1897-1905.

Benny Chor, et al., "Tracing Traitors", Advances in Cryptology-CRYPTO'94, LNCS 839, 1994, pp. 257-270.

Henk D. L. Hollmann, et al., "On Codes With the Identifiable Parent Property", Journal of Combinatorial Theory, Series 82, 1998, Article No. TA972851, pp. 121-133.

J. N. Staddon, "Combinatorial Properties of Frameproof and Traceability Codes", 2000, pp. 1-4.

Hirofumi Muratani, "Combinatorial Outer Codes for c-Secure CRT Codes", SCIS2002, 13D-3, 2002, (6 pgs).

Hirofumi Muratani, et al., "Collusion Resilience of Digital Watermarking", SCSI 2000,C06, 2000, pp. 1-8.

"Foundation of Watermarking", written by Kineo Matsui and Published 1998, by Morikita Publishing Company, (31 pgs).

* cited by examiner

| ID | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| S(1) | 0 | 1 | 2 | 0 | 1 | 2 | 0 | 1 | 2 | 0 | 1 | 2 | 0 | 1 | 2 |
| S(2) | 0 | 1 | 2 | 3 | 4 | 0 | 1 | 2 | 3 | 4 | 0 | 1 | 2 | 3 | 4 |
| S(3) | 0 | 1 | 2 | 3 | 4 | 5 | 6 | 0 | 1 | 2 | 3 | 4 | 5 | 6 | 0 |

FIG. 5A

| ID | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| S(1) | a | b | c | a | b | c | a | b | c | a | b | c | a | b | c |
| S(2) | a | b | c | d | e | a | b | c | d | e | a | b | c | d | e |
| S(3) | a | b | c | d | e | f | g | a | b | c | d | e | f | g | a |

FIG. 5B

| User ID | Symbol sequence corresponding to user ID | |
|---|---|---|
| 0 | {0, 0, 0} | {a, a, a} |
| 1 | {1, 1, 1} | {b, b, b} |
| 2 | {2, 2, 2} | {c, c, c} |
| 3 | {0, 3, 3} | {a, d, d} |
| 4 | {1, 4, 4} | {b, e, e} |
| 5 | {2, 0, 5} | {c, a, f} |
| 6 | {0, 1, 6} | {a, b, g} |
| 7 | {1, 2, 0} | {b, c, a} |
| 8 | {2, 3, 1} | {c, d, b} |
| 9 | {0, 4, 2} | {a, e, c} |
| 10 | {1, 0, 3} | {b, a, d} |
| 11 | {2, 1, 4} | {c, b, e} |
| 12 | {0, 2, 5} | {a, c, f} |
| 13 | {1, 3, 6} | {b, d, g} |
| 14 | {2, 4, 0} | {c, e, a} |

FIG. 6

DIGITAL WATERMARK EMBEDDING APPARATUS AND METHOD, AND DIGITAL WATERMARK ANALYSIS APPARATUS, METHOD AND PROGRAM

CROSS-REFERENCE TO RELATED APPLICATIONS

This application is a continuation application of application Ser. No. 10/648,522, filed Aug. 27, 2003, which is based upon and claims the benefit of priority from the prior Japanese Patent Application No. 2002-248941, filed Aug. 28, 2002. The entire contents of the above applications are incorporated herein by reference.

BACKGROUND OF THE INVENTION

1. Field of the Invention

The present invention relates to a digital watermark embedding apparatus, method and program for generating embedded codes corresponding to identification information, and embedding the codes into copies of contents, and a watermark analysis apparatus, method and program for extracting the identification information corresponding to the codes embedded in copies of contents used for collusive attacks.

2. Description of the Related Art

Digital contents (such as still images, moving images, sound, music, etc.) comprise a number of digital data items. Some of the data items can be changed, without altering the identity and monetary value of the digital contents. By doing this, various types of information can be embedded into digital contents. This is watermarking, a well-known technique.

Watermarking enables various types of watermark information to be embedded in digital contents, and to be detected and used for various purposes (such as copyright protection including control of use and/or copy). Watermark information includes, for example, information for identifying the owner of copyright or user of digital contents, right information for the owner of copyright, the condition of use of contents, secret information needed to use contents, copy control information, or a combination of the above.

A description will now be given of a technique used, for example, for embedding, into copies of digital contents, information for individually identifying the copies (such as watermark information precisely corresponding to each user ID), when the same digital contents are distributed to a number of users.

The technique of embedding identification information (or a code corresponding to this information) into each copy of digital contents can suppress illegal copying of digital contents, and protect the owner's copyright from copyright violation since when pirate copies appear on the market, the software pirate can be detected from the identification information of the pirate copy.

Further, if a user tries to invalidate identification information embedded in a copy of digital contents, they need to make significant alterations to it, since they do not know which bit corresponds to the identification information (or the code corresponding to the identification information), which may result in damage to the contents. This would be financially disadvantageous, thus may act as deterrence against illegal copying.

To overcome the above, a so-called "collusive attack" method has appeared.

The principle behind "collusive attacks" lies in the fact that different copies are embedded with different identification information items. For example, a plurality of users get together, and compare bit units of a number of copies, thereby detecting portions in which digital data differs. The identification information is altered or eliminated when the detected portions are altered (by, for example, majority decision, minority decision, randomization, etc.). Another method involves averaging the pixel values, which alters or eliminates the identification information.

This will be explained briefly. Assume that the following identification information items (actually, codes corresponding to the information items) A, B and C are embedded in the copies owned by persons A, B and C:

A: 10 . . . 00 . . .
B: 00 . . . 11 . . .
C: 11 . . . 01 . . .

In this case, information (code) 10 . . . 01 . . . , which differs from all the identification codes of the persons A, B and C, can be created by majority decision or averaging.

As a countermeasure against collusive attacks, there have been proposed various methods for embedding, as a digital watermark, a code (called a collusion resistance code) having a resistance against collusive attacks, i.e., a code for detecting some or all of the persons responsible for collusive attacks when the collusive attacks have occurred. Further, various tracing algorithms (for detecting an identification number embedded in contents and used for collusive attacks, thereby detecting the IDs of users of collusion) have been proposed. Theses algorithms are based on, for example, a c-secure code (disclosed in D. Boneh and J. Shaw, "Collusion-Secure Fingerprinting for Digital Data" Advance in Cryptology: Proceedings of CRYPTO'95, Springer-Verlag, pp. 452-465, 1995) or a c-secure CRT code (H. Muratani, "A Collusion-Secure Fingerprinting Codes Reduced by Chinese Remaindering and its Random-Error Resilience", Information Hiding Proceedings of the 4th International Workshop, IH 2001, pp. 303-315, 2001, or in Jpn Pat. Appln. KOKAI Publication No. 2001-285623).

The c-secure CRT code will be described briefly.

The c-secure CRT code has an adjacency code structure in which a number M of component codes are arranged adjacent to each other. For example, the i-th component code $W(i)$ is a bit sequence of a predetermined length that consists of only "0" bits, only "1" bits, or "0" and "1" bits (but, there is only one boundary between a series of "0" bits and a series of "1" bits). The number of "0" bits and "1" bits included in the component code $W(i)$, i.e., the boundary position of the "0" bit series and "1" bit series of the component code $W(i)$, is determined on the basis of the residual obtained by dividing identification information u by modular $p(i)$.

For example, assume that M=3, $p(1)$=3, $p(2)$=5, $p(3)$=7, and "T0(n, d) code" is used as the component code $W(i)$ (d=3), and identification information=user ID, the "T0(n, d) code" indicating a series of $B(0)$~$B(n-2)$, $B(j)$ indicating a series of "0" or "1" bits, $B(0)$~$B(n-2)$ being formed of only "0" bits or "1" bits, or formed of a combination of $B(0)$~$B(m-1)$ consisting of only "0" bits and $B(m)$~$B(n-2)$ consisting of only "1" bits.

In this assumption, a code corresponding to user ID=2 is:
000000 000000111111 000000111111111111

Further, a code corresponding to user ID=3 is:
111111 000000000111 000000000111111111

In this case, if the contents brought by two users of user ID=2 and user ID=3 are compared, it is found that the first to sixth bits, thirteenth to fifteenth bits and twenty-fifth to twenty-seventh bits from the left differ between the two 36-bit codes. Since these bits are found to be the part of each code that corresponds to identification information, the first to sixth bits, thirteenth to fifteenth bits and twenty-fifth to twenty-seventh bits from the left are altered into, for example, the following code that differs from user ID=2 and user ID=3:

010101 000000010111 000000010111111111

However, a code corresponding to a legal user ID does not have a portion in which a number of "1" or "0" bits less than a predetermined block size d (in the above case, d=3) exist. On the other hand, different portions of the codes detected from the contents used for collusive attacks contain both "0" and "1" bits. In other words, there are portions in which "0" or "1" bits less than a number d of bits (3 bits in the above case) exist isolatedly.

In light of this, in the tracing algorithm, each component of a detected code is checked. If there is a component code in which "0" or "1" bits less than a predetermined number d of bits (3 bits in the above case) exist isolatedly, it is determined that collusive attacks were made to the detected code.

In the c-secure CRT code, the sum of the maximum residual and minimum residual (a pair of residuals) is equal to a residual u mod p(i) for identification information u concerning a person responsible for collusion. The minimum residual indicates the position of the boundary (or an integer value indicative of the position) between an element containing only "0" bits, and an element containing a "1" bit, which appears for the first time when the i-th component code W(i) of a code detected from to-be-traced contents is checked beginning from the leftmost bit. The maximum residual indicates the position of the boundary (or an integer value indicative of the position) between an element containing only "1" bits, and an element containing a "0" bit, which appears for the first time when the i-th component code W(i) of the detected code is checked beginning from the rightmost bit. If the i-th component code W(i) consists of only "0" bits, the maximum residual=minimum residual=p(i)-1. If the i-th component code W(i) consists of only "1" bits, the maximum residual=minimum residual=0. If there is no boundary between an element containing only "0" bits and an element containing a "1" bit, the minimum residual=0. If there is no boundary between an element containing only "1" bits and an element containing a "0" bit, the maximum residual=p(i)-1.

Thus, part of or the entire identification information that would have been embedded in a copy used for collusive attacks can be obtained by analyzing a pair of residuals extracted from each component code of a c-secure CRT code detected from to-be-traced contents.

In the above-described case, identification information, user ID=2 and user ID=3, relating to the people responsible for collusion, is detected from the following code:

010101 000000010111 000000010111111111

This c-secure CRT code is based on the following marking assumption. That is, if a person responsible for collusion has a code in which a certain bit of a component code has a different value from that of the codes owned by the other people, the value of the corresponding bit of a component code created as a result of collusive attacks is determined stochastically. Accordingly, if the block size d is relatively large, the minimum and maximum residuals can be correctly detected.

In the c-secure CRT code, there may be a case where the minimum and maximum residuals cannot correctly be detected from to-be-traced contents.

For example, in the case of collusive attacks made by one hundred people, assume that a "0"-bit sequence is assigned to ninety-nine people and a "1"-bit sequence is assigned to the remaining one person in corresponding blocks of corresponding component codes. In the marking assumption, it is expected that a sequence of "1" and "0" bits is detected with a certain probability. However, in digital watermarking, in most cases, bit value determination is executed on the basis of whether or not a certain measurement amount exceeds a predetermined threshold value. If collusive attacks utilize contents averaging, the amount of measurement after collusive attacks is expected to be an average amount of measurement made before the collusive attacks. Specifically, in the case of averaging of 99 versus 1, the influence of the ninety-nine people side measurement amount is dominant, and it is highly probable that the value of the bit sequence is detected to be 0 that is ninety-nine people side value. If the above-mentioned block is one in which minimum and maximum residuals are to be detected, they cannot correctly be detected.

BRIEF SUMMARY OF THE INVENTION

The present invention has been developed in light of the above, and aims to provide a digital watermark embedding apparatus, digital watermark analysis apparatus, digital watermark embedding method and program, and digital watermark analysis method and program, which enhance the probability of correctly detecting identification information that would have been embedded in copies of contents against which collusive attacks were made.

According to a first aspect of the invention, there is provided a digital watermark embedding apparatus comprising: a first generation unit configured to generate a plurality of symbol sequences each of which includes a plurality of symbols including ranks, each of the ranks being uniquely numbered among each of the symbol sequences, each of the symbol sequences uniquely corresponding to each of a plurality of identification information items to be embedded as digital watermark information into each of copies of digital contents; a second generation unit configured to generate a plurality of to-be-embedded codes corresponding to each of the symbols in each of the symbol sequences; and an embedding unit configured to embed the to-be-embedded codes in each of the copies.

According to a second aspect of the invention, there is provided a digital watermark analysis apparatus for specifying at least one of a plurality of identification information items embedded as a plurality of watermark information items in a plurality of legal copies of digital contents used for collusive attacks, from a plurality of illegal copies of the digital contents obtained by collusive attacks made against the legal copies, the digital watermark analysis apparatus comprising: an extraction unit configured to extract a plurality of embedded codes including ranks from the illegal copies; an acquisition unit configured to acquire a plurality of symbols corresponding to the embedded codes and arrange the symbols in accordance with the ranks of the embedded codes, and acquire a first symbol sequence of symbol sequences each of which includes a plurality of the symbols based on the symbols; and a specifying unit configured to specify at least one of the identification information items embedded in the legal copies, based on the first symbol sequence and second symbol sequences uniquely assigned to the identification information items.

According to a third aspect of the invention, there is provided a digital watermark embedding method comprising: generating a plurality of symbol sequences each of which includes a plurality of symbols including ranks, each of the symbol sequences uniquely corresponding to each of a plurality of identification information items to be embedded as digital watermark information into each of copies of digital contents; generating a plurality of to-be-embedded codes corresponding to each of the symbols in each of the symbol sequences; and embedding the to-be-embedded codes in each of the copies.

According to a fourth aspect of the invention, there is provided a digital watermark analysis method of specifying at least one of a plurality of identification information items embedded as a plurality of watermark information items in a plurality of legal copies of digital contents used for collusive attacks, from a plurality of illegal copies of the digital contents obtained by collusive attacks made against the legal copies, the digital watermark analysis method comprising:

extracting a plurality of embedded codes including ranks from the illegal copies; acquiring a plurality of symbols corresponding to the embedded codes and arranging the symbols in accordance with the ranks of the embedded codes, and acquiring a first symbol sequence of symbol sequences each of which includes a plurality of the symbols based on the symbols; and specifying at least one of the identification information items embedded in the legal copies, based on the first symbol sequence and second symbol sequences uniquely assigned to the identification information items.

According to a fifth aspect of the invention, there is provided a program stored in a computer readable medium, comprising: means for instructing a computer to generate a plurality of symbol sequences each of which includes a plurality of symbols including ranks, each of the symbol sequences uniquely corresponding to each of a plurality of identification information items to be embedded as digital watermark information into each of copies of digital contents; means for instructing the computer to generate a plurality of to-be-embedded codes corresponding to each of the symbols in each of the symbol sequences; and means for instructing the computer to embed the to-be-embedded codes in each of the copies.

According to a sixth aspect of the invention, there is provided a program stored in a computer readable medium which enables a computer to function as a digital watermark analysis apparatus for specifying at least one of a plurality of identification information items embedded as a plurality of watermark information items in a plurality of legal copies of digital contents used for collusive attacks, from a plurality of illegal copies of the digital contents obtained by collusive attacks made against the legal copies, the program comprising: means for instructing the computer to extract a plurality of embedded codes including ranks from the illegal copies; means for instructing the computer to acquire a plurality of symbols corresponding to the embedded codes and arranging the symbols in accordance with the ranks of the embedded codes, and acquiring a first symbol sequence of symbol sequences each of which includes a plurality of the symbols based on the symbols; and means for instructing the computer to specify at least one of the identification information items embedded in the legal copies, based on the first symbol sequence and second symbol sequences uniquely assigned to the identification information items.

BRIEF DESCRIPTION OF THE SEVERAL VIEWS OF THE DRAWING

FIGS. 5A and 5B are views useful in explaining examples of identification information and a symbol sequence used in the embodiment;

FIG. 6 is a view useful in explaining examples of identification information and a symbol sequence used in the embodiment;

DETAILED DESCRIPTION OF THE INVENTION

An embodiment of the invention will be described with reference to the accompanying drawings.

A description will now be given of a case where respective identification information items are embedded as watermarking information items into copies of the same digital contents (still images, moving images, sound, music, etc.), and are traced. Hereinafter, the case of using a user identifier (user ID) as the identification information will be mainly described (users corresponding to copies, i.e., users who utilize the copies, such as those who can assign, lend or provide copies via recording and/or communication mediums). However, the identification information may be formed of information obtained by performing predetermined conversion on the user ID, information other than the user ID, or information obtained by converting the information other than the user ID. The user ID may contain information concerning the date and time of use, the place of use, etc.

It is a matter of course that any other type of watermarking information (e.g. information concerning the owner of the copyright of contents, information concerning the conditions of use of contents, secret information necessary when contents is used, copy control information, etc., or any combination of them) may be embedded and detected for various purposes (e.g. control of use, copyright protection including control of copying, acceleration of secondary use, etc.). In this case, the portion relating to watermarking information may have an arbitrary structure.

The structural figures used in this specification can be realized as apparatus function blocks, or software (program) function modules or procedures.

Figure 1:
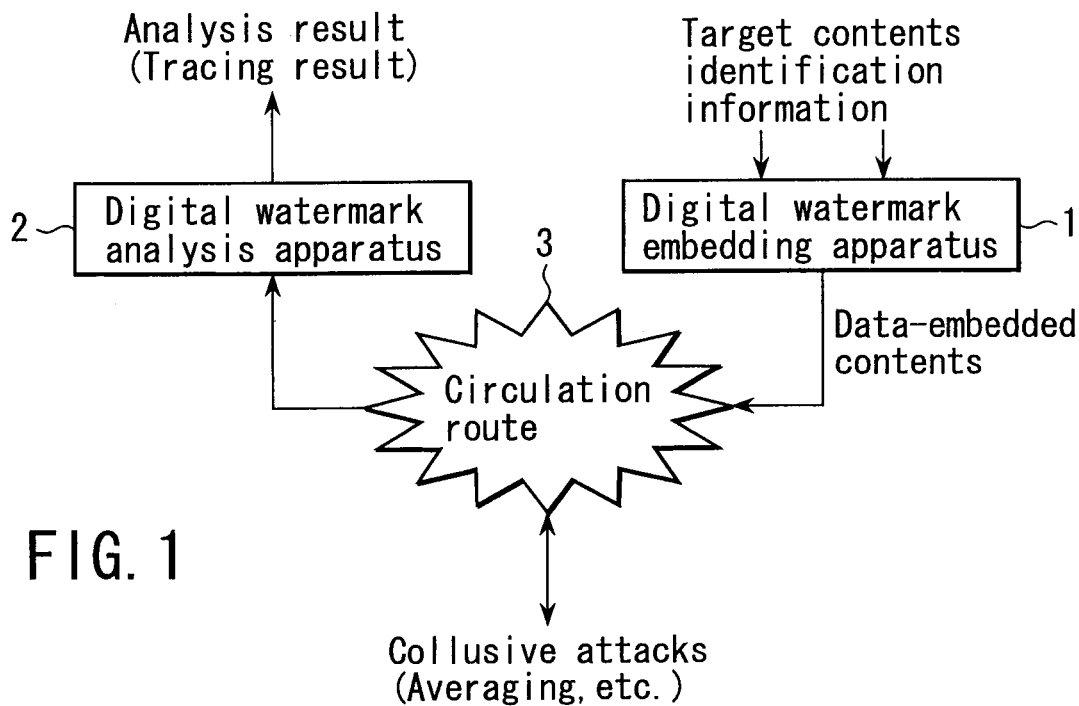
FIG. 1 is a schematic view illustrating the configuration of a contents circulation system including a digital watermark embedding apparatus and digital watermark analysis apparatus according to an embodiment of the invention.

FIG. 1 schematically shows a system to which a digital watermark embedding apparatus 1 and watermark analysis apparatus 2 according to the embodiment of the invention are applied.

The digital watermark embedding apparatus 1 and watermark analysis apparatus 2 are provided and managed at, for example, a contents-supplying side.

Alternatively, for example, the digital watermark embedding apparatus 1 may be provided at a user side (such as a user system connected to or incorporated in a computer system, dedicated device, etc. for using contents), while the digital watermark analysis apparatus 2 may be provided at a contents-supplying side.

In the first-mentioned case, embedding of watermark information into copies of digital contents is performed before the copies are transferred to users. In the latter case, such embedding is performed before users use copies.

Any method may be employed for the digital watermark embedding apparatus 1 to embed predetermined watermark data into digital contents, or for the digital watermark analysis apparatus 2 to extract watermark data from digital contents (see, for example, "Foundation of Watermarking" written by Kineo Matsui and published 1998 by Morikita Publishing Company).

The digital watermark embedding apparatus 1 can also be realized in the form of software (program). Similarly, the digital watermark analysis apparatus 2 can also be realized in the form of software (program). Further, when the digital watermark embedding apparatus 1 and digital watermark analysis apparatus 2 are used at a contents-supplying side, they can be realized as one body.

Figure 2:
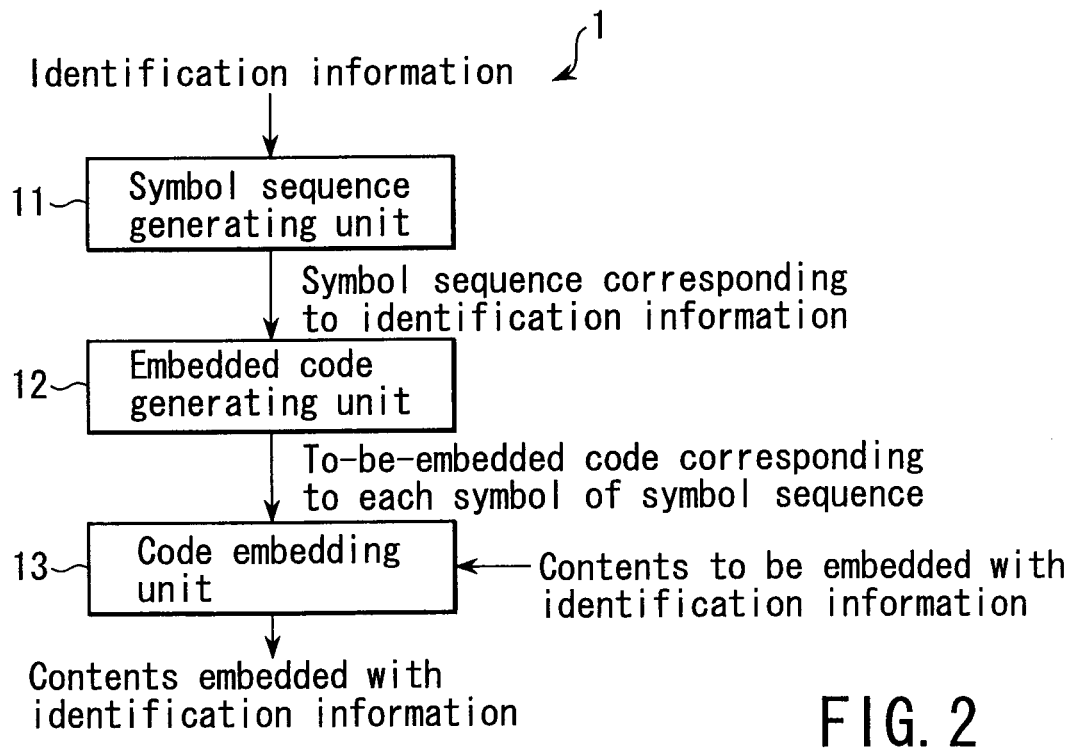
FIG. 2 is a view illustrating a configuration example of the digital watermark embedding apparatus according to the embodiment.

FIG. 2 shows an example of the digital watermark embedding apparatus 1.

As shown in FIG. 2, the digital watermark embedding apparatus 1 comprises a symbol sequence-generating unit 11 for generating a symbol sequence corresponding to-be-embedded identification information (e.g., a user ID), an embedded-code generating unit 12 for generating an embedded code (e.g. a random number sequence) corresponding to each symbol of the symbol sequence, and a code embedding unit 13 for embedding each generated embedded code into contents as a target.

When the digital watermark embedding apparatus 1 is supplied with contents and identification information to be embedded into the contents (e.g. the ID of a user to whom the contents are supplied), it generates a symbol sequence corresponding to the identification information, generates an embedded code corresponding to each symbol of the symbol sequence, and embeds each embedded code into the contents, thereby outputting the resultant contents as a copy corresponding to the identification information (e.g. a copy directed to a user with the user ID). When watermark information other than user IDs is used, it is also embedded.

If, for example, identification information is not a user ID and another type information is provided as a user ID, pre-processing to, for example, convert this user ID into identification information is performed.

Copies of the contents corresponding to identification information, output from the digital watermark embedding apparatus 1, circulate through a circulation route 3 by means of storage mediums, communication mediums, etc. Collusive attacks utilizing a number of copies are performed in the circulation route 3.

Collusive attacks are assumed to be, for example, a simple averaging operation (all contents used for collusive attacks are simply averaged with the same weight applied thereto), a weighted averaging operation (all contents used for collusive attacks are averaged with different weights applied thereto), etc.

Figure 3:
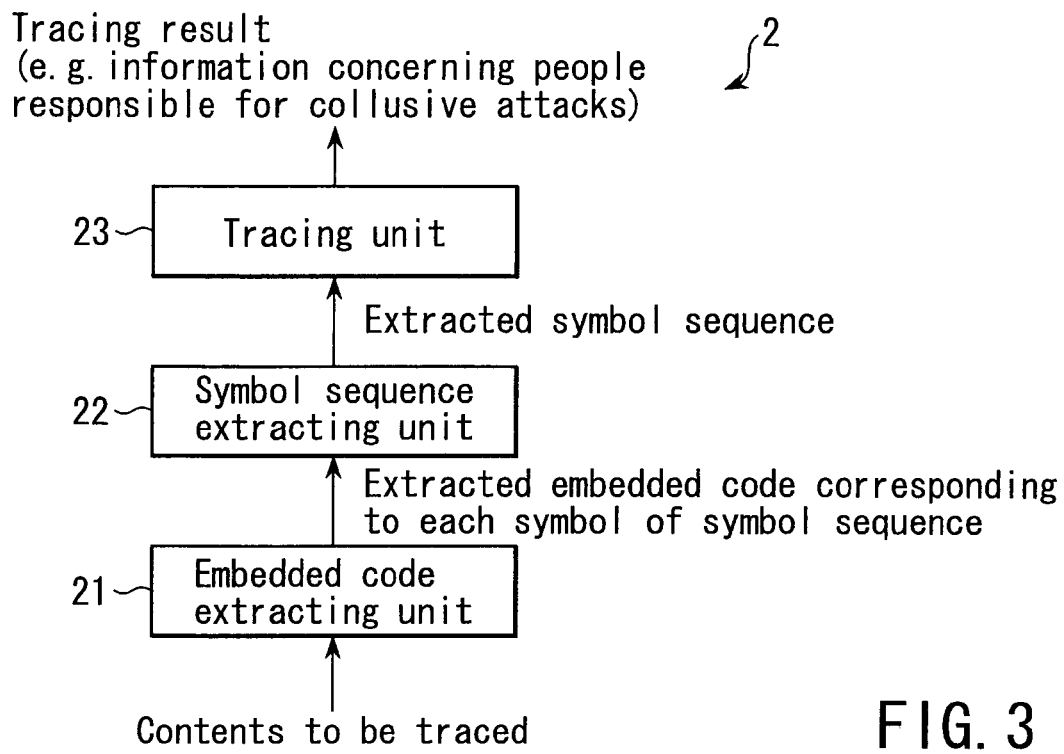
FIG. 3 is a view illustrating a configuration example of the digital watermark analysis apparatus according to the embodiment.

FIG. 3 shows an example of the digital watermark analysis apparatus 2.

As shown in FIG. 3, the digital watermark analysis apparatus 2 comprises an embedded-code extracting unit 21, symbol sequence extracting unit 22 and tracing unit 23.

The embedded-code extraction unit 21 extracts, from contents to be traced, an embedded code corresponding to each symbol contained in a to-be-extracted symbol sequence.

The symbol sequence extracting unit 22 obtains a symbol corresponding to each of the extracted embedded codes, and outputs a symbol sequence formed of the obtained symbols.

The tracing unit 23 applies a predetermined tracing algorithm to the output or extracted symbol sequence, thereby determining or estimating whether or not collusive attacks were made against it, or determining or estimating all or part of identification information (e.g. a user ID) embedded in copies used for collusive attacks.

If, for example, it is necessary to obtain a user ID since determined or estimated identification information is not a user ID, post-processing to, for example, convert this identification information into a user ID is executed.

There are various tracing algorithms and symbol sequence generating methods needed for the algorithms—such as stochastic methods that allow a predetermined amount of wrong detection when detecting the identification information of people responsible for collusive attacks, or deterministic methods that do not allow wrong detection when detecting the same.

This embodiment will now be described in more detail.

Hereinafter, assume that identification information is a user ID.

Further, assume hereinafter that a symbol sequence is assigned to each identification information item. However, a method is also possible in which a single symbol sequence is assigned to a plurality of identification information items.

Firstly, the digital watermark embedding apparatus 1 will be described.

Figure 4:
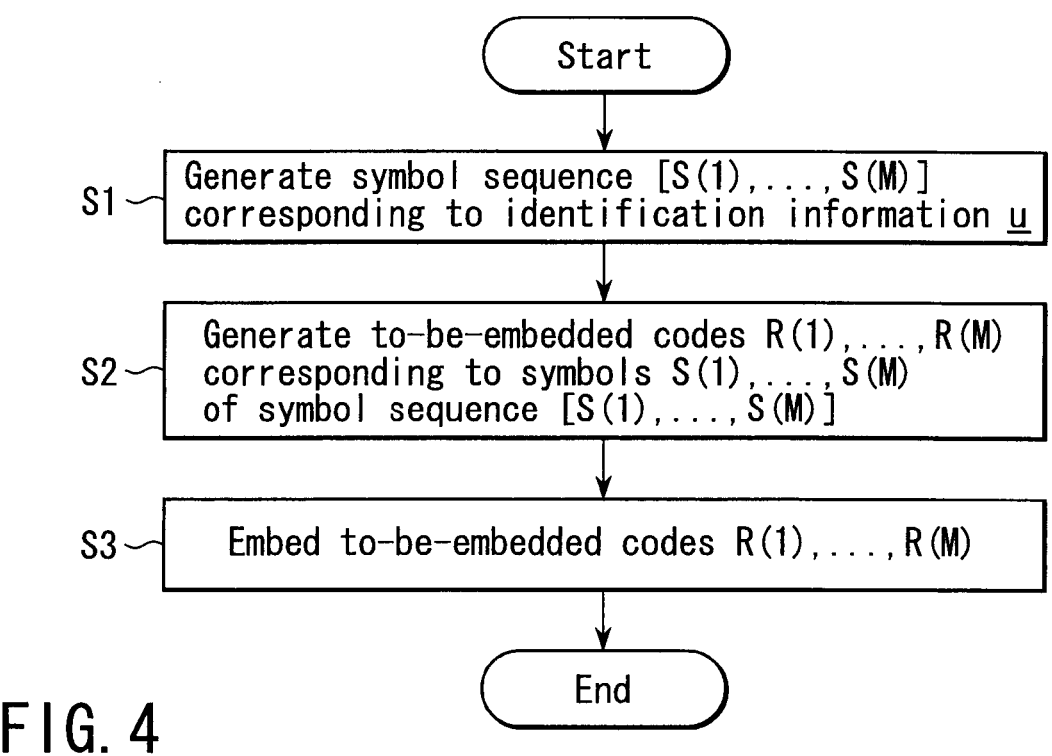
FIG. 4 is a schematic flowchart useful in explaining a procedure employed in the digital watermark embedding apparatus according to the embodiment.

FIG. 4 is a schematic view illustrating an example of a procedure.

The symbol sequence-generating unit 11 firstly obtains a symbol sequence $\{S(1), S(2), \ldots, S(M)\}$ formed of a number M of symbols and corresponding to identification information (in the embodiment, a user ID) to be embedded into target copies (step S1).

$S(1)$ represents (the value of) the first symbol of a symbol sequence assigned to the identification information, and $S(2)$ presents (the value of) the second symbol of the symbol sequence. The same can be said of $S(3), \ldots, S(M)$.

Concerning the symbol sequence, there are two methods—one for beforehand generating and storing a symbol sequence corresponding to each identification information item, and the other for generating a symbol sequence when necessary.

Since each symbol sequence uniquely corresponds to identification information, if a symbol sequence $\{S(1), S(2), \ldots, S(M)\}$ is given to certain correct identification information, identification information corresponding to this symbol sequence is uniquely specified. It is the tracing algorithm that is used to obtain identification information, used for collusive attacks, on the basis of a symbol sequence extracted from copies subjected to the collusive attacks.

Any type of symbol may be used. It is sufficient if symbols can be discriminated from each other. For example, an integer (or an integer sequence), an alphabet (or an alphabet sequence), or an alphanumeric character (or an alphanumeric character sequence) may be used as a symbol.

The values that the first symbol $S(1)$ can have (i.e., the elements of the first symbol $S(1)$), the values that the second symbol $S(2)$ can have, . . . , and the values that the M-th symbol $S(M)$ can have may be identical to each other or different from each other. For example, when integers are used as symbols, the first to third symbols $S(1)$~$S(3)$ may be set to have values falling in different ranges, such that the first symbol S(1) has one of 0~2, the second symbol S(2) has one of 0~4, and the third symbol S(2) has one of 0~6. Alternatively, the first and second symbols S(1) and S(2) may be set to have values falling in the same range, and the third symbol S(3) may be set to have a value falling in a range different from the first-mentioned one, such that the first and second symbols S(1) and S(2) each have one of 1~3, and the third symbol S(3) have one of 0~6. Alternatively, the first to third symbols S(1)~S(3) may be set to have values falling in a single range of, for example, 0~14. Furthermore, another structure may be employed in which, for example, an integer is used as the first symbol S(1), and an alphabet is used as the second symbol S(2).

In the specific examples described below, integers are used as the symbols. If, for example, an integer is firstly obtained, and then an alphabet corresponding to the integer is used as a symbol, it is sufficient if a conversion process for converting an integer into an alphabet may be added.

There are various methods for obtaining, from given identification information, a symbol sequence {S(1), S(2), ..., S(M)} directly corresponding to the information.

For example, the i-th symbol S(i) may assume an integer falling within a range of 0~N(i)−1. N(1), N(2), ..., N(M) are predetermined positive integers that differ from each other (integers that are prime to each other are desirable). N(1), N(2), ..., N(M) may satisfy the relationship, N(1)<N(2)<...<N(M) or N(1)=N(2)=...=N(M), or the like.

For the i-th symbol S(i) (i=1~M) in a symbol sequence corresponding to identification information, there are two methods—one method for assigning thereto a random value falling within a range of 0~N(i)−1, and the other method for assigning thereto a value falling within the range of 0~N(i)−1 in accordance with a predetermined rule. In any case, assume that a number M of symbols S(1), S(2), ..., S(M) is exclusively assigned to each identification information item, at least one of the number M of symbols assigned to each identification information item differing from the symbols assigned to the other identification information items.

There is a symbol sequence generating method for assigning a unique symbol sequence to each identification information item. In this method, for example, all or part of integers falling within a range of 0~{N(1)×N(2)×...×N(M)−1} are used as values for identification information, and a residual u mod N(i) obtained by dividing identification information u by N(i) is used as S(i) corresponding to the identification information u. In this case, it is desirable that a number M of values N(1), N(2), ..., N(M) be prime to each other (in the description below, assume that N(1)<N(2)<...<N(M)). As described later in detail, a predetermined constraint may be imparted to the relationship between the maximum number c of people estimated to be responsible for collusion, the number M of elements contained in a symbol sequence, and the range (e.g., a series of numbers beginning from 0) of used identification information.

A description will be given of a symbol sequence generating method using S(i)=u mod N(i), using an example in which low integers are utilized to facilitate the explanation.

For example, assume that the number M of elements incorporated in a symbol sequence is set to 3, and N(1), N(2) and N(3) are set to 3, 5 and 7, respectively. In this case, the first symbol S(1) assumes one of 0~2, the second symbol S(2) one of 0~4, and the third symbol S(3) one of 0~6.

Since N(1)×N(2)×N(3)−1=104, all or part of integers 0~104 are used as user IDs. In this example, integers 0~14 are used as user IDs.

If the user ID=7,
S(1)=7 mod N(1)=7 mod 3=1
S(2)=7 mod N(2)=7 mod 5=2
S(3)=7 mod N(3)=7 mod 7=0
Further, if the user ID=8,
S(1)=8 mod N(1)=8 mod 3=2
S(2)=8 mod N(2)=8 mod 5=3
S(3)=8 mod N(3)=8 mod 7=1

FIG. 5A illustrates the symbols S(1), S(2) and S(3) of symbol sequences corresponding to identification information items (user IDs=0~14).

When alphabets are used as symbols, the resultant symbol sequences are as shown in, for example, FIG. 5B (although in FIG. 5B, S(1), S(2) and S(3), which are set at 0 in FIG. 5A, are all set to a, they may be set to a, b and c, respectively).

In FIG. 5A, if the user ID=7, S(1)=1, S(2)=2 and S(3)=0, therefore the symbol sequence corresponding to the user ID=7 is

[1, 2, 0]

When alphabets are used as symbols, the symbol sequence corresponding to the user ID=7 is, for example,

[b, c, a]

Further, if the user ID=8, S(1)=2, S(2)=3 and S(3)=1, therefore the symbol sequence corresponding to the user ID=8 is

[2, 3, 1]

When alphabets are used as symbols, the symbol sequence corresponding to the user ID=8 is, for example,

[c, d, b]

FIG. 6 shows symbol sequences corresponding to identification information items (user IDs=0~14) shown in FIG. 5 (both the cases of using integers and alphabets are shown).

The embedded-code generating unit 12 receives the symbol sequence {S(1), S(2), ..., S(M)} generated by the symbol sequence-generating unit 11 and corresponding to the identification information (=user ID) to be embedded into a target copy, and generates a first embedded code R(1) corresponding to the first symbol S(1), a second embedded code R(2) corresponding to the second symbol S(2), ..., and an M-th embedded code R(M) corresponding to the M-th symbol S(M) (step S2). The embedded code corresponding to each symbol of a symbol sequence that corresponds to each identification information item may be prestored, or generated when necessary.

In the first symbol S(1), a first embedded code $w_1(i)$ corresponding to each element (i) that can be used as a value of the first symbol S(1) is made to have no cross-correlation with respect to any other code ($w_1(i)$ represents an embedded code corresponding to an element i of a certain symbol). Specifically, assume that if i≠j, $w_1(i) \cdot w_1(j)=0$, whereas if i=j, $w_1(i) \cdot w_1(j)=1$. If, for example, the value that the first symbol S(1) can have is a, b or c, the embedded code corresponding to the first symbol S(1) of a, that corresponding to the first symbol S(1) of b, and that corresponding to the first symbol S(1) of c are made to have no cross-correlation therebetween. The same can be said of the k-th symbol (k=2~M) (if i≠j, $w_k(i) \cdot w_k(j)=0$, whereas if i=j, $w_k(i) \cdot w_k(j)=1$). Instead of using codes that have no cross-correlation therebetween, codes that have a very low cross-correlation may be used (the latter case is practicable).

However, when embedding, into contents, first to M-th to-be-embedded codes corresponding to the first to M-th symbols that form a symbol sequence corresponding to identification information, if, for example, the first to M-th to-be-embedded codes are embedded in different portions to prevent them from interfering with each other, the above-mentioned constraint concerning the cross-correlation is not needed between the embedded code for the first symbol, that for the second symbol, . . . , and that for the M-th symbol.

On the other hand, if, for example, all or some of the first to M-th to-be-embedded codes corresponding to the first to M-th symbols are superposed at the same position, they usually influence or interfere with each other. In this case, all the adjacent codes should be made to have no cross-correlation or a very low cross-correlation. For example, when all the first to M-th to-be-embedded codes are superposed at the same position, all adjacent ones of the to-be-embedded codes corresponding to all elements of the first symbol and those corresponding to all elements of the M-th symbol should have no cross-correlation or a very low cross-correlation.

Various codes can be utilized as the embedded codes.

Figure 7:
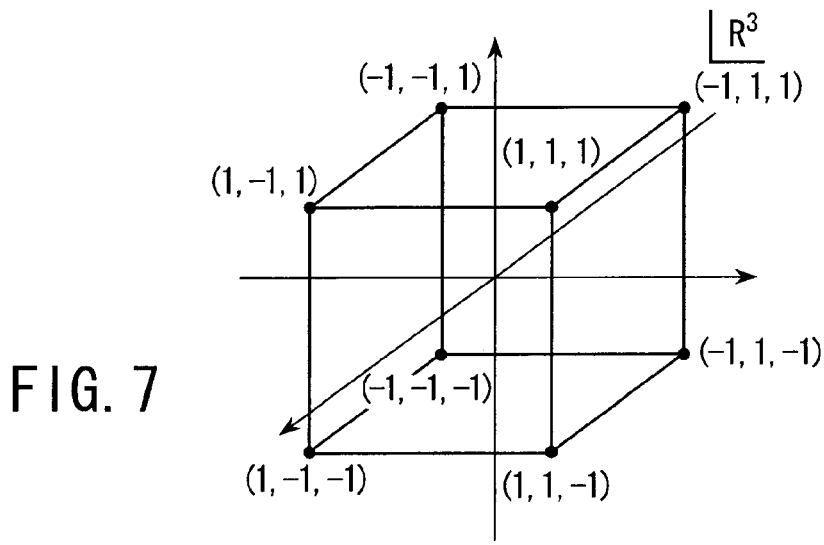
FIG. 7 is a view useful in explaining a simplex code.

For example, the simplex code described in Jpn. Pat. Appln. KOKAI Publication No. 2001-285623 can be used. The simplex code means a code that has a code length of n−1 and a number n of words, the cross-correlation of the words being −1/(n−1). This code can be constructed utilizing an n-th order Hadamard matrix. More specifically, the simplex code is a code positioned at the vertex of an (n−1)-th order simplex in an (n−1)-th order Euclidean space. For example, in the case of the three-dimensional Euclidean space, the simplex code is formed of a code in which the cross-correlation of three points (−1, −1, 1), (1, −1, −1) and (−1, 1, −1) as shown in FIG. 7 is −⅓.

The thus-obtained first to M-th to-be-embedded codes corresponding to the symbols of a symbol sequence that corresponds to identification information are embedded into contents by slightly changing the contents in accordance with the to-be-embedded codes by the code embedding unit 13 of the digital watermark embedding apparatus 1, utilizing a predetermined method (step S3). There are some contents-changing methods: a sequential embedding method in which a first to-be-embedded code R(1) is embedded into contents, then a second to-be-embedded code R(2) is embedded into the contents embedded with the first embedded code R(1), and the same embedding is repeated; a method in which all to-be-embedded codes R(1)~R(M) are simultaneously embedded into contents; etc.

As described above, the present invention can employ any method for embedding generated to-be-embedded codes into contents (for determining how and how much the contents should be changed).

However, the code structure, embedding position or embedding method should be selected so that to-be-embedded codes corresponding to each symbol (of a symbol sequence corresponding to identification information) will have no or a very low cross-correlation.

The digital watermark analysis apparatus 2 will now be described.

Firstly, a description will be given of collusive attacks and tracing of people responsible for collusive attacks, using low numerical values for facilitating the description.

In this embodiment, assume that collusive attacks utilize simple averaging or weighting/averaging of copies.

For example, contents acquired by three users with user IDs=0, 3, 10 shown in FIG. 6 are embedded, as symbol sequences, with:

[a, a, a]
[a, d, d]
[b, a, d]

Assume that these three users have made collusive attacks utilizing simple averaging of three copies of contents.

In the embodiment, in each of the first to M-th symbols of a symbol sequence corresponding to identification information, codes corresponding to different elements are embedded as digital watermarks that have no or a very low cross-correlation. Instead of maximum and minimum residuals (a pair of residuals), embedded codes (i.e., first to M-th embedded codes) are detected from each of the first to M-th symbols of the to-be-extracted symbol sequence, thereby extracting the symbol sequence on the basis of the relationship between the symbols and embedded codes. When each symbol is detected from a symbol sequence, a plurality of symbol elements embedded in contents actually used for collusive attacks may be detected (in the above-described example, a and b can be detected as the first symbol, a and d can be detected as the second symbol and a and d can be detected as the third symbol). In the embodiment, it is estimated, concerning each of the first to M-th symbols, which element is most often used for collusive attacks, thereby regarding the element as the highestly populated element, and tracing the identification information of the people responsible for the collusive attacks on the basis of the symbol sequence formed of highestly populated elements (symbols).

In a certain symbol in a to-be-extracted symbol sequence, if a plurality of elements considered highestly populated elements exist, only one of the elements may be detected as the highestly populated element. Alternatively, all the elements may be detected as a highestly populated element group.

Further, tracing may be performed, also considering a symbol detected in addition to highestly populated symbols.

In the above-described example, contents is generated which is embedded with a symbol sequence of the first to third symbols, each symbol being formed of the highestly populated element. Specifically, in the above example, contents embedded with a symbol sequence of [a, a, d] is generated. In this case, the digital watermark analysis apparatus 2 of the embodiment detects the symbol sequence of [a, a, d].

As seen from FIG. 6, there is no identification information that corresponds to a symbol sequence [a, a, d]. From this, it is understood that original identification information has been changed. Further, in addition to the highestly populated symbol, embedded codes corresponding to the elements b, d and a of the first to third symbols can be detected, which also indicates the occurrence of collusive attacks.

Thus, the digital watermark analysis apparatus 2 of the embodiment can trace the identification information of the people responsible for the collusive attacks, on the basis of the symbols [a, a, d] detected as the highestly populated symbols or symbol detected in addition to highestly populated symbols.

In the above-described example, utilizing a tracing algorithm and a method (as a method for deriving the algorithm) for constructing a symbol sequence generating method, only, for example, a user ID=0 (or, for example, all user IDs=0, 3, 10) can be specified at a certain rate of false recognition or at no false recognition rate.

Various tracing algorithms can be used. In a basic tracing algorithm, user IDs corresponding to embedded-codes/symbol sequences that would have been embedded in copies used for collusive attacks are acquired on the basis of the extracted symbol sequences, and are specified as the user IDs of the people responsible for the collusive attacks.

In the embodiment, the value of the i-th symbol of a symbol sequence as a highestly populated symbol is identical to the value of the i-th symbol of a symbol sequence corresponding to one of the user IDs of users responsible for the collusive attacks. Accordingly, by analyzing a symbol sequence acquired from embedded codes from target contents and corresponding to highestly populated symbols, it is expected that the user ID of at least one person of the people responsible for collusive attacks can be specified, although it is difficult to determine all the user IDs of the people.

Further, if the extracted symbol sequence is identical to the symbol sequence corresponding to the user ID of a legitimate user, it is determined that no collusive attacks have been made. However, even when the extracted symbol sequence formed of highestly populated symbols is identical to a symbol sequence corresponding to a legitimate user, if there is an embedded code corresponding to a symbol other than the highestly populated symbols, it is considered that collusive attacks have been made but failed in changing the symbol sequence. In other words, the user of the specified user ID is responsible for collusive attacks.

A stochastic method and deterministic method are typical tracing algorithms.

In the stochastic method, basically, a certain user ID is output as that of a person responsible for collusive attacks, if the certain user ID corresponds to a predetermined number of symbols selected from a symbol sequence detected from target contents (i.e., if the values of a predetermined number of symbols selected from the detected symbol sequence are identical to the respective values of symbols of a symbol sequence corresponding to identification information as a certain user ID, these symbols being located at the same positions as the first-mentioned symbols). The predetermined number is determined on the basis of, for example, a rate of false recognition (false recognition occurs, for example, when the selected symbols does not actually belong to one user but to a plurality of users, and the user ID of a user who is not responsible for collusive attacks is accidentally output). To minimize the rate of false recognition, it is sufficient if, for example, the above-mentioned predetermined number is set to a higher value.

In the deterministic method, basically, the user ID of a user responsible for collusive attacks is determined from a detected symbol sequence, without false recognition. Specifically, the user ID of a person responsible for collusive attacks, which is indispensable to generate the detected symbol sequence by the collusive attacks, is analyzed and determined. If the user ID cannot be determined, this case is determined to be impossible to trace. To make the trace impossible case 0 or minimize the case, it is sufficient, for example, if the number of the symbols of a symbol sequence is increased with the range of user IDs kept constant.

Figure 8:
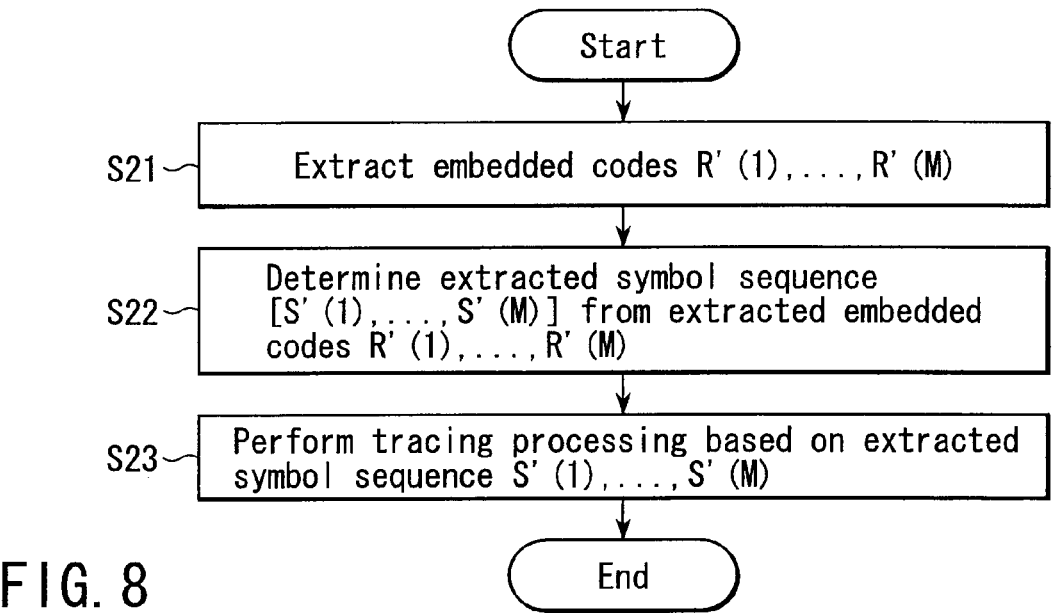
FIG. 8 is a schematic flowchart useful in explaining a procedure employed in the digital watermark analysis apparatus according to the embodiment.

FIG. 8 schematically shows a procedure example.

In the digital watermark analysis apparatus 2 of the embodiment, firstly, the embedded-code extraction unit 21 extracts embedded codes R' (1), R'(2), . . . , R'(M) from copies of contents as detection targets (step S21). Subsequently, the symbol sequence extraction unit 22 extracts, from the extracted embedded codes R'(1), R'(2), . . . , R'(M), a corresponding symbol sequence {S'(1), S'(2), . . . , S'(N)} (step S22).

Figure 9:
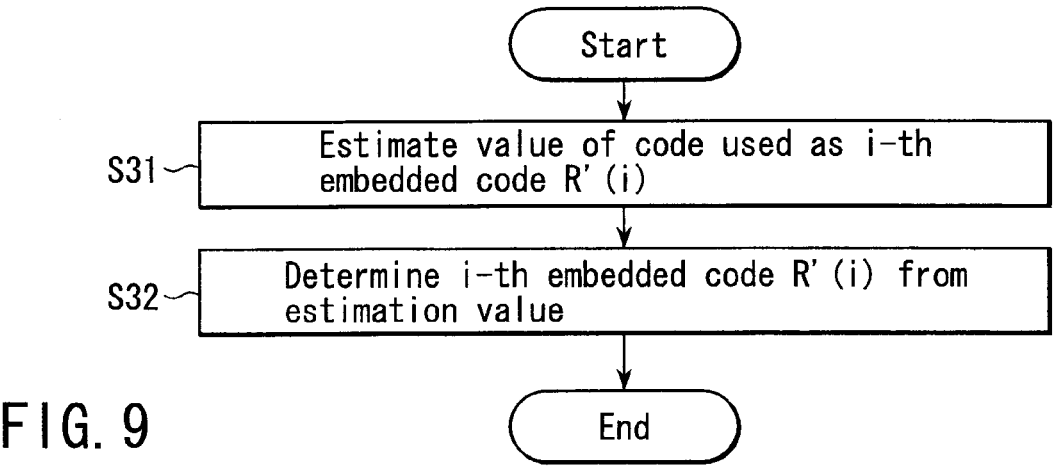
FIG. 9 is a schematic flowchart useful in explaining a procedure employed in an embedded-code extracting unit that is incorporated in the embodiment.

FIG. 9 shows a procedure example of the embedded-code extraction unit 21.

Concerning each of the embedded codes R'(1), R'(2), . . . , R'(M) corresponding to the symbols S'(1), S'(2), . . . , S'(M) of a symbol sequence to be extracted from copies of contents as tracing targets, the embedded-code extraction unit 21 acquires the estimation value of a code that may be used as an embedded code R' (i) (i.e., an embedded code corresponding to each element of a symbol S'(i)) (estimation computation process) (step S31). On the basis of the estimation value of each code corresponding to the embedded code R' (i), the i-th embedded code is determined (HPE (Highestly Populated Elements) computation process) (step S32).

In the case of collusive attacks utilizing averaging, there is an analysis result in which digital watermark information can be erased by the collusive attacks of a number $\Omega\,((L/\ln n)^{1/2})$ of persons (Document 1: J. Kilian, F. T. Leighton, L. R. Matheson, T. G. Shamoon, R. E. Tarjan and F. Zane, "Resistance of Digital Watermarks to Collusive Attacks", NEC Research Institute, Technical Report TR-585-98, 1998). L represents the size of contents (the capacity for digital watermark information), and n represents the total number of users as distribution destinations. If the maximum collusion size is c, contents of a length L (L is proportional to $c^2 \ln n$) is needed, therefore digital watermark information is lost if c is a large value. This analysis is made on the presumption that digital watermark information is superposed as random Gaussian noise. The average of digital watermark information becomes 0 from the central limiting theorem if c is increased by collusive attacks utilizing averaging.

In light of the above, the embodiment employs the above-mentioned method, in which a to-be-embedded code $r_{i,j}$ corresponding to one element $a_{i,j}$ selected from a number N(i) of elements $(a_{i,0}, a_{i,j}, \ldots, a_{i,N(i)-1})$ is embedded as a digital watermark into the i-th symbol (i=0~M) in a symbol sequence indicative of each user ID. $r_{i,j}$ represents is a to-be-embedded code having no or a very low cross-correlation with a to-be-embedded code $r_{i,k}$ corresponding to another element $a_{i,k}$ (k≠j). When collusive attacks utilizing averaging have been performed, not a group of pairs of residuals (=maximum and minimum residuals), but the i-th symbol as a highestly populated symbol is detected, thereby detecting an extracted symbol sequence formed of highestly populated symbols.

For example, in the analysis disclosed in the above-mentioned Document 1, digital watermark information is modeled as Gaussian noise. In this method, digital watermarks have values only in a very limited portion (e.g., the N(i)-th order portion) of the Gaussian space. Moreover, since the digital watermarks intersect each other, they do not cancel out even by averaging.

An embedded code corresponding to a highestly populated symbol is extracted, for example, as follows:

In the above estimation value computation process, an embedded code $m_{i,j}$ having no cross-correction with each element $a_{i,j}$ (j=0~N(i-1)) corresponds to the i-th symbol of a to-be-extracted symbol sequence (i.e. $m_{i,j} \cdot m_{i,k} = \delta_{j,k}$). Concerning the i-th symbol, the cross-correlation $C_{i,j} = m_{i,j} \cdot I$ between contents I and the embedded code $m_{i,j}$ corresponding to each element $a_{i,j}$ is measured. This cross-correlation $C_{i,j}$ is used as an estimation value for the embedded code $m_{i,j}$ corresponding to the i-th symbol. An embedded code $m_{i,jmax}$ at which the value $C_{i,j}$ is maximum, corresponds to the highestly populated element of the i-th symbol. That is, the element $a_{i,jmax}$ of the i-th symbol corresponding to the embedded code $m_{i,jmax}$ is the highestly populated element of the i-th symbol.

Figure 10:
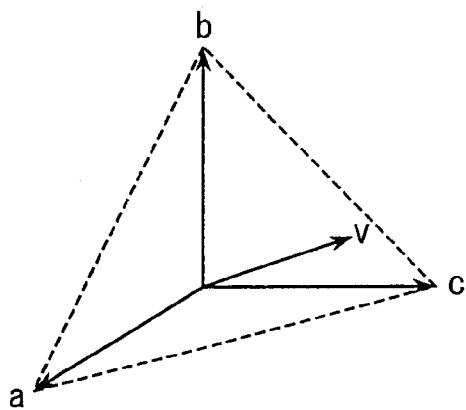
FIG. 10 is a view useful in explaining a highestly populated symbol used in the embodiment.

FIG. 10 is a view useful in explaining how to determine the highestly populated symbol corresponding to a certain symbol (assume that this symbol is the first symbol) contained in a to-be-extracted symbol sequence. Assume that a vector v represents an estimation value for each candidate code for the first embedded code corresponding to each element (a, b, c in the embodiment) of the first symbol. In FIG. 10, each axis corresponds to each element of the first symbol. The element closest to the vector v is output as the first symbol of the to-be-extracted symbol sequence.

Figure 11A:
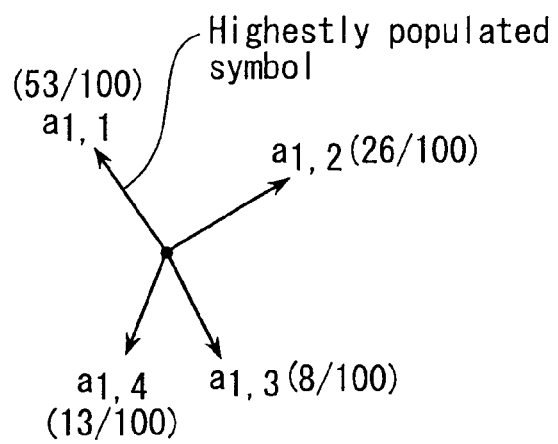
FIGS. 11A, 11B and 11C are views useful in explaining a highestly populated symbol used in the embodiment.
Figure 11B:
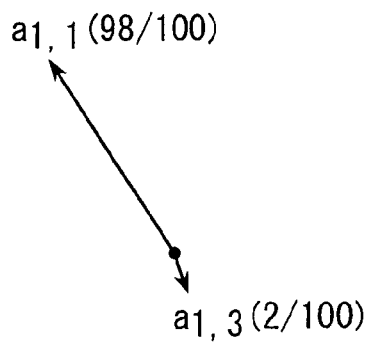
Figure 11C:
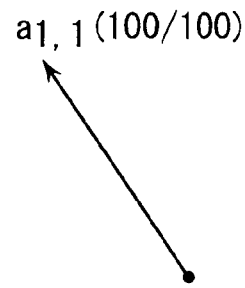

Specifically, assume that as shown in FIG. 11A, the number of copies of contents used for collusive attacks utilizing the simple averaging method is 100 (or the total number of copies of contents in consideration of weights in the weighting/averaging method is 100), and that the populations (the number of copies of contents used for the collusive attacks and related to each element) corresponding to the elements $a_{1,1}, a_{1,2}, a_{1,3}$ and $a_{1,4}$ of the first symbol are 53, 23, 8 and 13, respectively. In this case, the embedded-code extraction unit 21 determines an embedded code $r_{1,1}$ corresponding to the first symbol element $a_{1,1}$ as the highestly populated element. Upon receiving the determined first embedded code $r_{1,1}$ the symbol sequence extraction unit 22 sets the symbol element $a_{1,1}$, corresponding thereto as the first symbol. Similarly, the second to M-th symbols formed of respective highestly populated elements are determined, thereby obtaining a to-be-extracted symbol sequence. Depending upon the combination of identification information items embedded in copies of contents used for collusive attacks, there may be a case where almost one symbol element or only one symbol element is populated as shown in FIG. 11B or 11C.

As described above, if there exist a plurality of highestly populated elements in a certain symbol of a to-be-extracted symbol sequence, only one of the highestly populated elements may be used as a highestly populated symbol. Alternatively, a plurality of highestly populated elements may be detected as a highestly populated group.

Tracing may be performed utilizing detected symbol elements other than the highestly populated group, in addition to this group.

After that, the tracing unit 23 executes a tracing algorithm on the extracted symbol sequence $\{S'(1), S'(2), \ldots, S'(M)\}$ (step S23).

Firstly, a description will be given of a tracing algorithm example employed in a stochastic method.

A method for stochastically specifying the people responsible for collusion attacks, on the basis of a symbol sequence formed of highestly populated symbols is obtained by, for example, changing marking assumption in the c-secure CRT code. In this case, assume that concerning the i-th symbol, the probability of detecting a certain element $a_{i,j}$ as the highestly populated element is $1/N(i)$. This is a proper assumption on condition that collusive attacks are performed at random (or on condition that the elements of the i-th symbol are randomly exchangeable for each other, and the certain element $a_{i,j}$ as the highestly populated element is detected from randomly exchanged elements).

Figure 12:
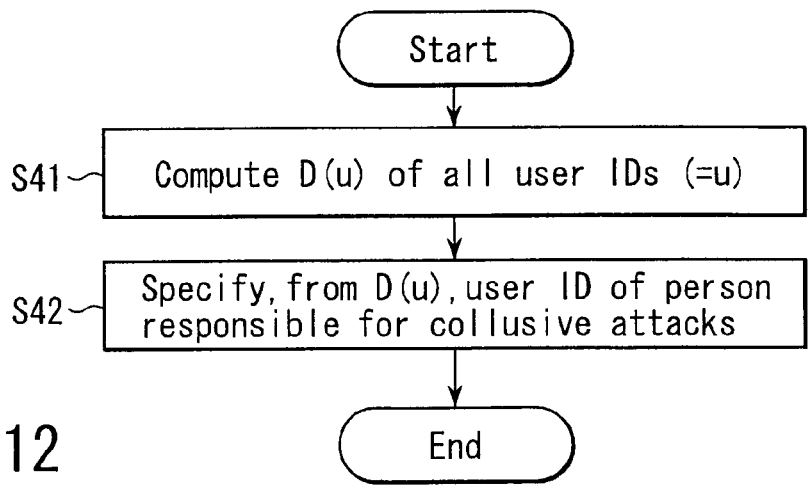
FIG. 12 is a flowchart illustrating a procedure employed in a tracing unit that is incorporated in the embodiment.

FIG. 12 shows a procedure example of this processing.

Firstly, concerning all user IDs (=Ui), D(Ui) is obtained (step S41).

D(Ui) represents the number of identical symbols obtained when each symbol of a symbol sequence $\{S(1), S(2), \ldots, S(M)\}=\{$Ui mod N(1), Ui mode N(2), $\ldots,$ Ui mod N(M)$\}$ assigned to a user with the user ID=Ui is compared with a corresponding symbol of the extracted symbol sequence $\{(S'(1), S'(2), \ldots, S'(M)\}$.

Subsequently, the thus-obtained D(Ui) is compared with a predetermined threshold value Dth. If D(Ui)≧Dth, the user ID of Ui is determined to be a user ID of the people responsible for collusive attacks (step S42).

Dth is, for example, $(k+l)$. Here k is such a number that the product of $N(1), \ldots, N(k)$ is not less than the total number of user IDs (identification information items) $(N(1)≦N(2)≦ \ldots ≦N(M))$, and l is given by the following formula (1):

$$[1-\Pi 1/N(i)]^S \geq 1-\epsilon_2 \quad (1)$$

where the range of i that assumes $\Pi$ is i=1~$l$ or $$i=k+l\sim(k+l)$$

$$S = {}_M C_k + l, \text{ and}$$

$\epsilon_2$ represents the rate of error tracing in each user ID of the people responsible for collusive attacks, and satisfies $0<\epsilon_2<1$.

For example, in the previously mentioned case, the contents obtained by the users with the user IDs of 0, 3 and 10 are embedded with the following respective symbol sequences:

[a, a, a]
[a, d, d]
[b, a, d]

Assume that these three users have performed collusive attacks on three copies of contents utilizing a simple averaging operation, thereby generating a copy of the contents embedded with

[a, a, d]

Also assume that a symbol sequence [a, a, d] has been extracted.

When the symbol sequence originally assigned to the user ID=0 is compared with the extracted symbol sequence, the first and second symbols are identical (i.e., a), but the third symbols of the sequences are a and d. Accordingly, D(0)=2. Similarly, D(3)=2 and D(10)=2.

If Dth=2, only the three user IDs of 0, 3 and 10 included in the user IDs of 0~14 shown in FIG. 6 satisfy D(0)≧Dth, D(3)≧Dth, D(10)≧Dth. In this case, the user IDs of 0, 3 and 10 are determined to be the user IDs of the people responsible for collusive attacks.

In the conventional c-secure CRT code, each inner code is formed of a plurality of blocks, and the maximum and minimum residuals are detected by observing the bit flipping of each block. Further, each bit contained in each block is assumed to be embedded as a digital watermark. On the other hand, in the embodiment, the elements of a symbol sequence are embedded as digital watermark information, therefore the problem concerning inner code sensitivity can be overcome by detecting highestly populated symbols. Further, since the code structure is made simple, the code length can be shortened. As described above, the same tracing operation can be performed on an outer code as on a c-secure CRT code by preparing a number of inner codes determined under conditions for obtaining c-secure properties that reflect changes in marking assumption for an outer code of a c-secure CRT code.

A description will now be given of the difference between the method employed in the present invention and the method described in Document 2, Y. Yacobi, "Improved Boneh-Shaw content fingerprinting", Topics in Cryptology—C-RSA 2001, PP. 378-391, 2001. Document 2 has proposed a method for replacing the block of an inner code with digital watermark information. In this technique, the problem concerning the inner code sensitivity for obtaining maximum and minimum residuals is not solved. However, the technique of Document 2 presupposes the use of an outer code utilizing an error correction code or a code structure utilizing a random code, as proposed in Document 3, D. Boneh and J. Shaw, "Collusion-Secure Fingerprinting for Digital Data", Advance in Cryptology: Proceedings of CYPTO'95, Springer-Verlag, pp. 452-465, 1995, or Document 4, D. Boneh and J. Shaw, "Collusion-Secure Fingerprinting for Digital Data", IEEE Transactions on Information Theory, Vol. 44, No. 5, pp. 1897-1905, 1998. In these outer codes, a pair of maximum and minimum residuals are not needed, but it is sufficient if only one residual can be detected. However, this outer code has a length of O ($c^2 \cdot \log n$), therefore the code length abruptly increases as c increases.

A tracing algorithm example as a deterministic method will be described.

A tracing algorithm example as a deterministic method is disclosed in, for example, Document 5, H. Muratani, "Combinatorial Outer Codes for c-secure CRT Codes", SCIS2002, 13D-3, 2002. In this case, if the number c of people responsible for collusive attacks is large, it is preferable to set the length of an embedded code relatively long. However, if c is small, it is sufficient if the embedded code is set shorter than that employed in a tracing algorithm as a stochastic method.

To eliminate or minimize erroneous detections, a predetermined restriction may be given to the relationship between the estimated maximum number c of people responsible for collusive attacks, the number M of the elements of a symbol sequence, and the range of used identification information items (for example, a serial number range beginning from 0). Specifically, the relationship $M > c^2 \cdot (k-1)$ may be established.

In the tracing algorithm, the maximum number of people responsible for collusive attacks is estimated to be c. In other words, a description will be given of the case where a number a of people responsible for collusion that satisfy $2 \leq a \leq c$, i.e., collusive attacks using a number a of copies of contents that contain different identification information items are performed. In this case, one user is considered to correspond to one identification information item. However, one user can correspond to a plurality of identification information items. Specifically, if the same user uses, for collusive attacks, two copies of contents embedded with the same identification information assigned to the user, the number of the people responsible for the collusion attacks is considered for each of the copies of the contents embedded with different identification information items.

An identification information group formed of different identification information items embedded in a number a ($2 \leq a \leq c$) of copies of contents used for collusive attacks will be hereinafter referred to as a "collusion group". For example, in the examples of FIG. 6, since the identification information=user IDs=0~14, if the maximum number c of the people responsible for collusion attacks is 3 (actually, the range of identification information and the maximum number of the people responsible for collusive attacks are set to higher values), the collusion group is formed of [0, 1], [0, 2], . . . , [0, 14], [1, 1], [11, 14], [12, 13], [12, 14], [13, 14] (in the case of a=2), and formed of [0, 1, 2], [0, 1, 3], [0, 1, 14], [0, 2, 3], [0, 2, 4], . . . , [0, 2, 14], [0, 3, 4], . . . , [10, 11, 14], [11, 12, 13], [11, 12, 14], [12, 13, 14] (in the case of a=3). When the maximum number c=3 or less, collusive attacks are performed by one of the above collusion groups.

The symbol sequence extracted from the contents as a tracing target is input, and the collusion group conforming to the extracted symbol sequence is output.

That a certain collusion group conforms to an extracted symbol sequence means this. If it is determined, from a symbol sequence uniquely corresponding to each identification information item contained in the collusion group, that the symbol sequence can be generated by a certain collusive operation (e.g., averaging), the collusive group is determined to conform to the extracted symbol sequence.

Specifically, in the examples of FIG. 6, if a symbol sequence [a, a, d] is extracted from certain contents, the collusion group comprising the above-mentioned user IDs of 0, 3 and 10 shown in FIG. 6 conforms to the extracted symbol sequence [a, a, d].

Depending upon the contents of the extracted symbol sequence, only one collusion group or a plurality of collusion groups can conform to it.

If the extracted symbol sequence is identical to a symbol sequence corresponding to any one of legitimate user IDs, and if there are no symbols other than highestly populated ones, it is determined that no collusive attacks have been made. However, even if the extracted symbol sequence containing highestly populated symbols is identical to a symbol sequence corresponding to any one of legitimate user IDs, if an embedded code corresponding to a symbol other than the highestly populated ones is detected, it is considered that collusive attacks have been made but failed in modifying the symbol sequence. In this case, the user with the detected user ID is responsible for the collusive attacks.

Further, if any collusion group conforming to the extracted symbol sequence cannot be obtained for some reason, it is determined that the digital watermark analysis has failed.

If only one collusion group has been obtained for the extracted symbol sequence, all the identification information of the collusion group is considered to be that of the people responsible for the collusive attacks.

On the other hand, if two or more collusion groups have been obtained, only identification information (one or more identification information items) that commonly exists in all the collusion groups is considered to be that of the people responsible for the collusive attacks. The identification information common to the collusion groups will be referred to as "common identification information".

If a plurality of collusion groups are obtained from the same residual-pair representation, it cannot be determined (only from an extracted symbol sequence) which collusion group corresponds to the user ID (identification information) of a person actually responsible for collusive attacks. However, if collusive attacks have been made with a number of people less than the maximum number of people, one of the collusion groups is the to-be-detected collusion group. Accordingly, if the obtained collusion groups contain common identification information, at least the common identification information belongs to the people actually responsible for the collusion attacks.

Even when two or more collusion groups have been obtained, if there is no common identification information, it is determined that the people responsible for the collusive attacks cannot be specified. Further, when the watermark analysis is constructed such that theoretically, obtained collusion groups always contain common identification information, if there is a case where the collusion groups contain no identification information, it is determined that a certain error has occurred.

As described above, at least one of the people responsible for collusion attacks can be reliably detected, which is significantly useful in preventing illegal copies of digital contents, and/or saving a copyright concerning the digital contents when the copyright has been infringed.

It is desirable to minimize the cases where a plurality of collusion groups are obtained, but no common identification information is detected therefrom. These cases can be reduced by certain means.

For example, it is effective to employ a method in which such a case where no common identification information is obtained from a plurality of collusion groups is searched for, and part or all of the identification information that forms the collusion groups is not used.

Further, if, for example, the estimated maximum number c of the people responsible for collusive attacks is constant, the above-mentioned cases can be reduced qualitatively by increasing the number M (=the number of component codes), or reducing the range of identification information.

Figure 13:
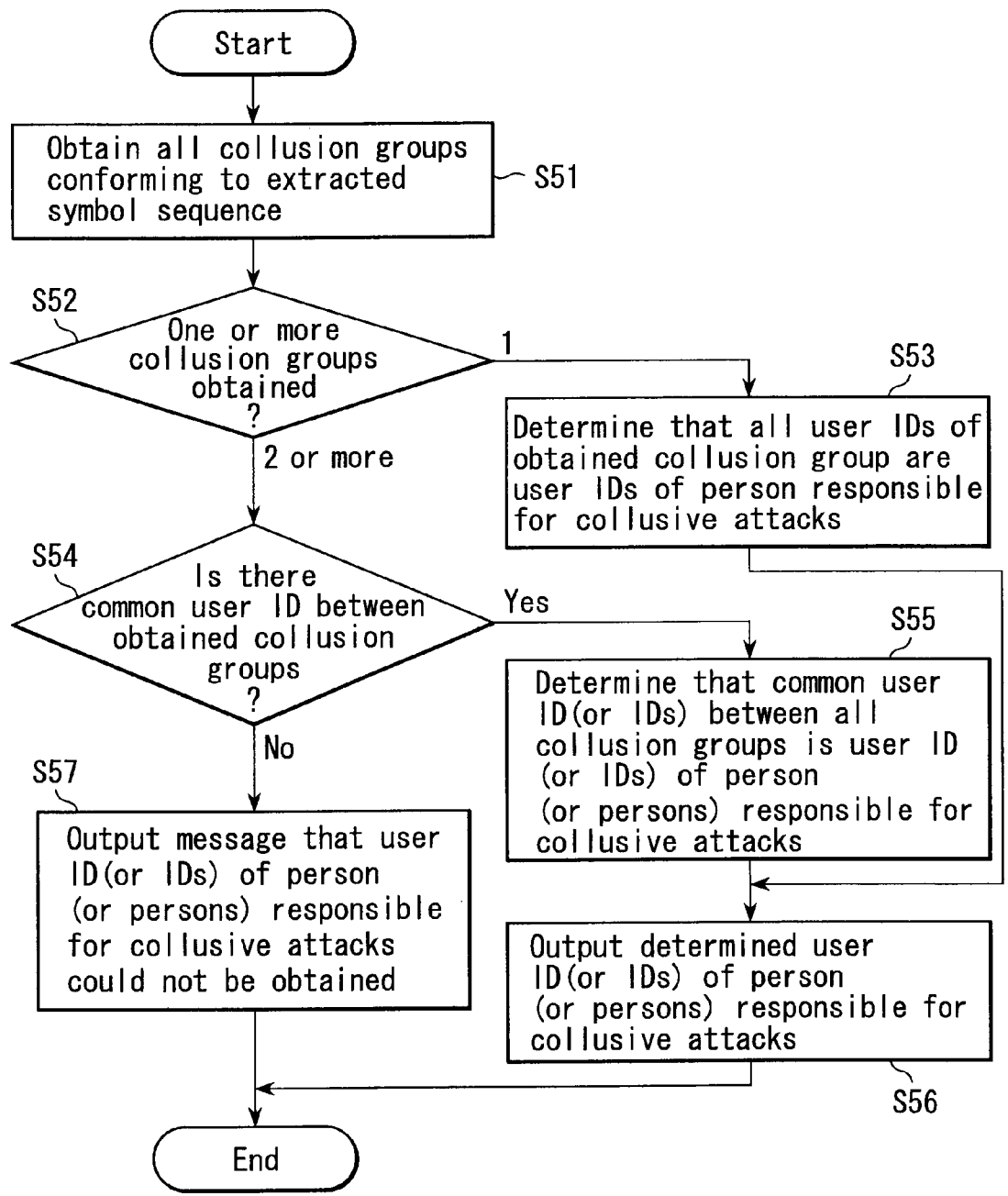
FIG. 13 is a flowchart illustrating another procedure employed in the tracing unit of the embodiment.

FIG. 13 shows a procedure example in this case.

Firstly, all collusion groups that conform to an extracted symbol sequence are obtained (step S51).

If only one collusion group is obtained (step S52), all the user IDs of the one collusion group are determined to be the user IDs of the people responsible for collusion attacks (step S53), thereby outputting the determined user ID (step S56).

If two or more collusion groups are obtained (step S52), and the collusion groups contain a common user ID (step S54), only the common user ID is determined to be the user ID of the people responsible for the collusion attacks (step S55), and is output (step S56). On the other hand, if there is no common user ID between the collusion groups (step S54), a message "none of the users ID of the people responsible for the collusion attacks is obtained" is output (or the message and information indicative of the collusion groups, or the message and extracted symbol sequence are output) (step S57).

If no collusion groups are obtained at the step S52, it is determined that the analysis has failed.

If the total number of user IDs is large, it costs much to perform the above processing on all collusion groups. To avoid this, the processing may be performed only on a limited number of collusion groups under a condition concerning, for example, the size of collusion groups, or a condition that does not seem to be broken through at a high probability by collusive attacks.

As another code-constructing method, a method for utilizing an error correction code as an outer code for the c-secure CRT code can be employed. Also in this case, a method for performing deterministic tracing and that for performing stochastic tracing are considered. Concerning an outer code for deterministic tracing, see, as well as the above-mentioned Documents 3 and 4, Document 6, B. Chor, A. Fiat and M. Naor, "Tracing Traitors", Advances in Cryptology-CRYPTO'94, LNCS 839, PP. 257-270, 1994; Document 7, H. D. L. Hollmann, J. H. van Lint, J.-P. Linnartz and L. M. G. M. Tolhuizen, "On Codes with the identifiable Parent Property", Journal of Combinatorial Theory, Series 82, pp. 121-133, 1998; Document 8, J. N. Staddon, D. R. Stinson and R. Wei, "Combinational Properties of frameproof and traceability codes", 2000; Document 9, R. Safavi-Naini and Y. Wang, "Collusion Secure q-ary Fingerprinting for Perceptual Content", Workshop on Security and Privacy in Digital Rights Management 2001, November 2001.

Stochastic tracing can be realized by performing expansion of an outer code for a conventional c-secure CRT code (disclosed in, for example, Document 10, H. Muratani, "Collusion Resilience of Digital Watermarking", SCSI 2000, C06, 2000; or Document 11, H. Muratani, "A Collusion-Secure Fingerprinting Code Reduced by Chinese Remaindering and its Random-Error Resilience", Information Hiding, Proceedings of the 4th International Workshop, IH 2001, pp. 303-315, 2001.

An example in which a Reed-Solomon code is used will be described.

Assume that $M=c(k+\ell)$, C is a narrow sense $[M, k, M-k+1]_q$ Reed-Solomon code.

If the following formula (2) is satisfied, the Reed-Solomon code C can be made to be a stochastic outer code:

$$[1-1/q^\ell]^S \geq 1-\epsilon \quad (2)$$

where $S = {}_M C_k + \ell$, $q = N(1) = N(2) = \ldots = N(M)$, and $\epsilon$ represents the rate of error tracing in each user ID (identification information) of the people responsible for collusive attacks, and is a real number that satisfies $0 < \epsilon < 1$.

In this case, the above-described tracing algorithm example as a stochastic method is applicable. In the tracing algorithm example as a stochastic method, l included in the formula, $Dth=k+\ell$, may be given by, for example, formula (2) instead of formula (1).

It is a matter of course that the above-mentioned tracing algorithm example as a deterministic method is also applicable.

The tracing algorithm can be constructed on the basis of an AG (Algebraic Geometry) code instead of the Reed-Solomon code.

The hardware and software structures employed in the embodiment will be described.

The digital watermark analysis apparatus of the embodiment can be realized by hardware or software (a program for enabling a computer to execute predetermined means, or to function as predetermined means, or to realize a predetermined function). When realizing the digital watermark analysis apparatus utilizing a program, the program can be transferred using a recording medium or communication medium. Of course, the same can be said of the digital watermark embedding apparatus.

Further, when realizing the digital watermark analysis or embedding apparatus by hardware, it can be formed of a semiconductor apparatus.

Furthermore, when constructing the digital watermark analysis apparatus or program to which the embodiment of the present invention is applied, if the apparatus or program employs blocks or modules of the same structure (or having a common structure), they can be created individually, or only one or an appropriate number of blocks or modules may be prepared and commonly used in each section of an algorithm. The same can be said of the case where the digital watermark embedding apparatus or program is constructed. Similarly, when constructing a system that the contains digital watermark embedding and analysis apparatuses, or when constructing a system that contains the digital watermark embedding and detection programs, if the apparatuses and programs employ blocks or modules of the same structure (or having a common structure), the blocks or modules can be created individually, or only one or an appropriate number of blocks or modules may be prepared and commonly used in each section of an algorithm utilized in the systems.

Also, when the digital watermark embedding or analysis apparatus is realized by software, a multi-processor may be used to perform parallel processing in order to enhance the processing speed.

In addition, the above-described structures can form not only part of an apparatus, but also an apparatus as a whole. For example, the symbol sequence extracting unit 22 of the digital watermark analysis apparatus can be realized as an integral part of the apparatus, or a component or module incorporated in the apparatus, or an independent decoding unit.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark analysis apparatus for specifying at least one of a plurality of identification information items embedded as a plurality of watermark information items in a plurality of legal copies of digital contents used for collusive attacks, from a plurality of illegal copies of the digital contents obtained by collusive attacks made against the legal copies, the digital watermark analysis apparatus comprising:
   an extraction unit configured to extract a plurality of embedded codes including ranks from the illegal copies, each of the ranks being uniquely numbered among each of the embedded codes and extract, in units of ranks, one of the embedded codes which is estimated to be most frequently used in the collusive attacks;
   an acquisition unit configured to acquire a plurality of symbols corresponding to the embedded codes and arrange the symbols in accordance with the ranks of the embedded codes, and acquire a first symbol sequence of symbol sequences each of which includes a plurality of the arranged symbols; and
   a specifying unit configured to specify at least one of the identification information items embedded in the legal copies, based on the first symbol sequence and second symbol sequences uniquely assigned to the identification information items.

2. The digital watermark analysis apparatus according to claim 1, wherein:
   the specifying unit specifies at least one of the identification information items based on the second symbol sequences each of which include a plurality of symbols including the ranks; and
   the acquisition unit acquires a plurality of the symbols including the ranks, the symbols corresponding to the embedded codes, the embedded codes being embedded in the legal copies.

3. The digital watermark analysis apparatus according to claim 1, wherein:
   the extraction unit extracts several of the embedded codes which are generated in a random number sequence such that the embedded codes corresponding to the symbols including a same rank in the symbol sequences include one of no cross-correlation and a very low cross-correlation; and
   the extraction unit obtains, in units of the ranks, cross-correlation between embedded codes corresponding to the symbols contained in the first symbol sequence, and obtains one of the embedded codes which includes a maximum cross-correlation.

4. The digital watermark analysis apparatus according to claim 1, wherein the identification information items includes unique information assigned to users who provide the legal copies.

5. A digital watermark analysis method of specifying at least one of a plurality of identification information items embedded as a plurality of watermark information items in a plurality of legal copies of digital contents used for collusive attacks, from a plurality of illegal copies of the digital contents obtained by collusive attacks made against the legal copies, the digital watermark analysis method comprising:
   extracting a plurality of embedded codes including ranks from the illegal copies, each of the ranks being uniquely numbered among each of the embedded codes and extracting, in units of ranks, one of the embedded codes which is estimated to be most frequently used in the collusive attacks;
   acquiring a plurality of symbols corresponding to the embedded codes and arranging the symbols in accordance with the ranks of the embedded codes, and acquiring a first symbol sequence of symbol sequences each of which includes a plurality of the symbols; and
   specifying at least one of the identification information items embedded in the legal copies, based on a plurality of second symbol sequences uniquely assigned to the identification information items and the first symbol sequence.

6. A program stored in a computer readable medium which enables a computer to function as a digital watermark analysis apparatus for specifying at least one of a plurality of identification information items embedded as a plurality of watermark information items in a plurality of legal copies of digital contents used for collusive attacks, from a plurality of illegal copies of the digital contents obtained by collusive attacks made against the legal copies, the program comprising:
   means for instructing the computer to extract a plurality of embedded codes including ranks from the illegal copies, each of the ranks being uniquely numbered among each of the embedded codes and extracting, in units of ranks, one of the embedded codes which is estimated to be most frequently used in the collusive attacks;
   means for instructing the computer to acquire a plurality of symbols corresponding to the embedded codes and arranging the symbols in accordance with the ranks of the embedded codes, and acquiring a first symbol sequence of symbol sequences each of which includes a plurality of the symbols based on the symbols; and
   means for instructing the computer to specify at least one of the identification information items embedded in the legal copies, based on the first symbol sequence and second symbol sequences uniquely assigned to the identification information items.

7. A digital watermark analysis apparatus for specifying at least one of a plurality of identification information items embedded as a plurality of watermark information items in a plurality of legal copies of digital contents used for collusive attacks, from a plurality of illegal copies of the digital contents obtained by collusive attacks made against the legal copies, the digital watermark analysis apparatus comprising:
   an extraction unit configured to extract an embedded code including components from one of the illegal copies, each of the components being uniquely ordered among the components and extract, in units of components, the embedded code which is estimated to be most frequently used in the collusive attacks to obtain a plurality of embedded codes;
   an acquisition unit configured to acquire a plurality of symbols corresponding to the embedded codes and arrange the symbols in accordance with the components included in each of the embedded codes, and acquire a first symbol sequence of symbol sequences each of which includes a plurality of the symbols based on the symbols; and a specifying unit configured to specify at least one of the identification information items embedded in the legal copies, based on the first symbol sequence and second symbol sequences uniquely assigned to the identification information items.

8. The digital watermark analysis apparatus according to claim 7, wherein:
the specifying unit specifies at least one of the identification information items based on the second symbol sequences each of which include a plurality of symbols including the components; and
the acquisition unit acquires a plurality of the symbols including the components, the symbols corresponding to the embedded codes, the embedded codes being embedded in the legal copies.

9. The digital watermark analysis apparatus according to claim 7, wherein:
the extraction unit extracts several of the embedded codes which are generated in a random number sequence such that the embedded codes corresponding to the symbols including a same component in the symbol sequences include one of no cross-correlation and a very low cross-correlation; and
the extraction unit obtains, in units of the components, cross-correlation between embedded codes corresponding to the symbols contained in the first symbol sequence, and obtains one of the embedded codes which includes a maximum cross-correlation.

10. The digital watermark analysis apparatus according to claim 7, wherein the identification information items includes unique information assigned to users who provide the legal copies.

11. A digital watermark analysis method of specifying at least one of a plurality of identification information items embedded as a plurality of watermark information items in a plurality of legal copies of digital contents used for collusive attacks, from a plurality of illegal copies of the digital contents obtained by collusive attacks made against the legal copies, the digital watermark analysis method comprising:
extracting an embedded code including components from one of the illegal copies, each of the components being uniquely ordered among the components and extracting, in units of components, the embedded code which is estimated to be most frequently used in the collusive attacks to obtain a plurality of embedded codes;
acquiring a plurality of symbols corresponding to the embedded codes and arranging the symbols in accordance with the components included in each of the embedded codes, and acquiring a first symbol sequence of symbol sequences each of which includes a plurality of the symbols based on the symbols; and
specifying at least one of the identification information items embedded in the legal copies, based on the first symbol sequence and second symbol sequences uniquely assigned to the identification information items.

12. A program stored in a computer readable medium which enables a computer to function as a digital watermark analysis apparatus for specifying at least one of a plurality of identification information items embedded as a plurality of watermark information items in a plurality of legal copies of digital contents used for collusive attacks, from a plurality of illegal copies of the digital contents obtained by collusive attacks made against the legal copies, the program comprising:
means for instructing the computer to extract a plurality of embedded codes including ranks from the illegal copies, each of the ranks being uniquely numbered among each of the symbol sequences;
means for instructing the computer to acquire a plurality of symbols corresponding to the embedded codes and arranging the symbols in accordance with the ranks of the embedded codes, and acquiring a first symbol sequence of symbol sequences each of which includes a plurality of the symbols based on the symbols; and
means for instructing the computer to specify at least one of the identification information items embedded in the legal copies, based on the first symbol sequence and second symbol sequences uniquely assigned to the identification information items.

* * * * *